United States Patent [19]

Wells et al.

[11] Patent Number: 5,371,759
[45] Date of Patent: Dec. 6, 1994

[54] D.C. FURNACE WITH A HEARTH ELECTRODE, HEARTH ELECTRODE AND ELECTRODE BLOCK, AS WELL AS PROCESS FOR OPERATING SAID FURNACE

[75] Inventors: William Wells, Aylesbeare, Great Britain; Emil Elsner, Brielow, Germany

[73] Assignee: Kortec AG, Zug, Switzerland

[21] Appl. No.: 50,267

[22] PCT Filed: Oct. 9, 1992

[86] PCT No.: PCT/EP92/02089

§ 371 Date: Aug. 10, 1993

§ 102(e) Date: Aug. 10, 1993

[87] PCT Pub. No.: WO93/05626

PCT Pub. Date: Mar. 18, 1993

[30] Foreign Application Priority Data

Sep. 12, 1991 [DE] Germany .................. 4130397

[51] Int. Cl.⁵ ........................................... H05B 7/00
[52] U.S. Cl. ................................ 373/72; 373/108; 75/10.1; 266/265
[58] Field of Search .............. 373/71, 72, 101, 108; 75/10 R, 10.41; 266/265

[56] References Cited

U.S. PATENT DOCUMENTS

| 3,076,085 | 1/1963 | Sundstrom | 373/72 |
| 4,228,314 | 10/1980 | Stenkvist | 373/72 |
| 4,533,385 | 8/1985 | Lugscheider et al. | 75/10 R |
| 4,592,066 | 5/1986 | Repetto et al. | 373/72 |
| 4,617,671 | 10/1986 | Lugscheider et al. | 373/22 |
| 4,749,408 | 6/1988 | Tate et al. | 75/10.41 |
| 5,052,018 | 9/1991 | Meredith | 373/72 |

FOREIGN PATENT DOCUMENTS

| 0124490 | 11/1984 | European Pat. Off. |
| 0125200 | 11/1984 | European Pat. Off. |
| 0157104 | 10/1985 | European Pat. Off. |
| 0221270 | 5/1987 | European Pat. Off. |
| 0388255 | 9/1990 | European Pat. Off. |
| 0219650 | 4/1991 | European Pat. Off. |
| 0422406 | 4/1991 | European Pat. Off. |
| 0449258 | 10/1991 | European Pat. Off. |
| 2637632 | 2/1978 | Germany |
| 2828634 | 2/1979 | Germany |
| 3106741 | 9/1982 | Germany |
| 3406760 | 9/1985 | Germany |
| 3316366 | 10/1985 | Germany |
| 3709905 | 8/1989 | Germany |
| 57-060011 | 4/1982 | Japan |
| 60-18271 | 1/1985 | Japan |
| 2267489 | 1/1990 | Japan |

OTHER PUBLICATIONS

Database WPIL Section Ch, week 8802, Derwent Publications Ltd., London, GB; Class M, AN 88-009121 & GB; A, 2 192 446 (Thoshin Steel Co. Ltd.) 13 Nov. 1988.

Database WPIL Section Ch, week 8413, Derwent Publications Ltd., London, GB; Class M, AN 84-075288 & AT, D, 444 582 (Voest-Alpine AG) 15 Feb. 1984.

Mortl, G.; Grabner, B.; Hutter, U. Spulelemente Fur LD-Konverter Und Elektrolichtbogenofen, Jan. 1988, Radex-Rundschau pp. 481-490.

Schbert, von M.; Reinhard, W. Aufbau Und Betriebserfahrungen Mit Einem 15-t-Gleichstrom-Lichtbogenofen Jun. 1983.

Elektrowarme International 41 pp. 124-129.

Operation of the DC Arc Furnace at Nucor, Steel Times, Jul. 1986 pp. 344,346.

*Primary Examiner*—Bruce A. Reynolds
*Assistant Examiner*—Tu Hoang

[57] ABSTRACT

For the purposes of better cooling and improving the starting conditions of a direct current arc furnace, there is provided a hearth electrode which comprises at least one metal bar passing through the hearth wall and which is cooled by at least one cooling duct which extends along the metal bar to the inner end thereof and opens into the interior of the furnace.

15 Claims, 4 Drawing Sheets

D.C. FURNACE WITH A HEARTH ELECTRODE, HEARTH ELECTRODE AND ELECTRODE BLOCK, AS WELL AS PROCESS FOR OPERATING SAID FURNACE

BACKGROUND OF THE INVENTION

The invention relates to a direct current arc furnace or direct current resistance smelting furnace It also relates to a hearth electrode for insertion into the hearth wall of a furnace and an electrode block having such a hearth electrode. Finally the invention also concerns a method of operating such a furnace.

DE-A1-31 06 741 discloses a contact electrode arrangement for electric arc or resistance smelting furnaces, having a base plate which is arranged outside the furnace brick lining structure and to which the outer ends of a plurality of bar-shaped electrodes are conductively connected, wherein the remaining part of the electrode extends into the furnace brick lining structure and is in contact with the molten bath in the furnace hearth. The base plate is disposed at a spacing beneath the furnace bottom. Provided between the base plate and the furnace bottom is an intermediate space into which can flow a fluid for cooling the electrode neck portions, the outside of the furnace and the base plate.

EP-B1-0 219 650 discloses a similar contact electrode arrangement which is in the form of an inter! changeable structural unit.

EP-A1-0 12 4 490 discloses a bottom electrode for a direct current arc furnace, which in the form of an electrically conducting prefabricated structural unit is connected to the metal bath and which rests by way of a layer of electrically conductive granular material on a connecting plate which has a downwardly extending fluid-cooled projection. The interchangeable electrically conducting structural unit which is in contact with the molten bath includes a plurality of metal bars, as current conductors. Also disposed therein are one or more porous bodies for the introduction of a gas, the function of which is to prevent overheating phenomena, by virtue of an increased bath movement. In addition, the structural unit is cooled by the gas which is passed through the porous bricks.

The object of the present invention is to improve the cooling of the electrodes in a direct current are furnace or resistance smelting furnace in order thereby to be able to increase the current loading of the electrodes and thus the output and capacity of the furnace. The invention also seeks to provide an electrode for a direct current arc furnace which permits an improvement in the firing conditions and stabilisation of the arc plasma. The invention also seeks to provide that, after the formation of a molten bath, bath movement for better distribution of the heat in the bath and a desired metallurgical treatment can be carried out with the cooling fluid for cooling the electrodes.

Finally, an object of the invention is to provide a hearth electrode which is distinguished by an increased cooling action and thus a higher current load-carrying capability.

In addition the invention seeks to provide an electrode block having such a hearth electrode, which block can be fitted into the hearth wall of a smelting furnace.

Finally, the invention seeks to provide a method of operating a furnace of the specified kind, which improves firing of the arc in the initial phase of the smelting procedure and promotes the formation of a stable arc plasma for rapid melting of the solid charge.

SUMMARY OF THE INVENTION

In the furnace according to the invention, direct cooling of the hearth electrode which may include one or more metal bars by way of which the current is carried is no longer restricted to the region of said metal bars, which is disposed outwardly in the hearth wall, but the cooling duct extends along the metal bar or bars as far as the inner end thereof and opens into the interior of the furnace. In that way the cooling fluid cools the metal bar over its entire length and thus permits substantially improved cooling for the inner region of the electrode, which is subjected to the greatest thermal loading. The cooling fluid is blown into the furnace in the axial direction of the metal bar and accordingly, with a suitable arrangement of the electrode and a suitable choice in respect of the cooling fluid, provides improved arc firing conditions and stabilisation of the arc plasma which is thus formed. That effect can be further enhanced by pulverised carbon being injected through the cooling duct itself or through adjacent ducts.

After the formation of a metal sump pool above the hearth electrode, the injected cooling fluid produces a bath movement which, in known furnaces, is caused by separate gases which are injected by way of what are known as scavenging or flushing bricks. In addition, with a suitable choice in respect of the cooling fluid, it is also possible to carry out a desired metallurgical treatment.

Inert gas such as Ar, $N_2$ and $CO_2$ has proven to be advantageous as a cooling fluid for promoting the firing and starting procedure in the initial phase of a smelting process, the inert gas promoting the formation of an arc plasma and stabilising the plasma. In regard to the cooling effect, an aerosol with water as cooling fluid is preferably used after the hearth electrode is covered with molten bath.

One or more hearth electrodes or electrode blocks may be provided in the lower or lateral hearth wall, the position thereof being determined not only in regard to electrical points of view but also in consideration of the cooling fluid which is blown in, sprayed in or forced in by pressure. To provide a further increase in capacity, the combination with current delivery from the entire bottom region of the furnace hearth has also proven to be advantageous. In that case the bottom is formed from electrically conducting, refractory material and is electrically conductingly connected to a bottom plate of the furnace hearth, which has at least one electrical connection for a current conductor.

The electrode block according to the invention includes at least one hearth electrode and possibly also at least one nozzle in a body of refractory material of high density, for example of magnesite or magnesite-graphite, which is resistant to chemical loadings, mechanical erosion and thermal shocks, that is to say a cyclic thermal loading. The graphite in the refractory body contributes to current conduction.

A particularly suitable cooling fluid, in regard to the cooling function, is a spray mist comprising an inert gas, for example argon, nitrogen or carbon dioxide, in conjunction with water. Instead of or in addition to the spray mist of water, it is also possible to use hydrocarbons, hydroxyls and liquid carbon dioxide. The cooling fluid is injected under pressure through the cooling duct or ducts and protects the electrodes and the refractory material surrounding the electrodes from damage due to steel and slag in the furnace. When the gases or the injected aerosol pass into the liquid bath in the furnace hearth, that causes movement of the bath. In the case of a cold furnace, the arc is stabilised, in particular when the hearth electrode is disposed beneath the tip of the upper electrode and the gas which is injected through the hearth electrode is directed towards the electrode tip. As long as the hearth electrode is not yet covered with molten bath at the beginning of the smelting process, the above-mentioned inert gases are injected without the addition of water, for safety reasons.

The cooling action and thus the effect of protecting the electrodes is achieved by the rise in temperature of the cooling fluid, the phase transition from the liquid to the vaporous state, that is to say for example from water to water vapour, and finally dissociation of the cooling agent into its constituents. As the water is only injected in spray mist form and only when the hearth bottom has reached such a high temperature that the water evaporates, that is to say when the electrodes for example are already covered with molten bath, there is no risk of explosion.

As already mentioned, the hearth electrode according to the invention or the electrode block according to the invention are also suitable for the performance of metallurgical procedures. For that purpose, either the cooling fluid is suitably selected, or the metal bar of the hearth electrode can be arranged within at least two concentric tubes and the outer annular ducts can be used for injection of agents which are required for the metallurgical treatment. In the case of an electrode block, nozzles for the introduction of suitable agents may also be provided in the body of refractory material, adjacent to one or more hearth electrodes, wherein said nozzles preferably comprise at least two tubes which are arranged at a spacing and in concentric relationship with each other forming a central duct and an annular duct, and the agent is injected into the central duct and a cooling fluid corresponding to the cooling fluid of the hearth electrode is injected through the annular duct. In that way, with the hearth electrodes or the stated electrode blocks, it is possible to effect carburisation of the metal bath by injecting carbon and to effect decarburisation of the metal bath by injecting oxygen or iron ore fines. The injection of carbon through such hearth electrodes or additional nozzles in the electrode block can also be used to particular advantage for starting the furnace after filling with solid charge material because the level of conductivity between the charge material and the hearth electrode is improved by the quantity of coal dust which is formed at the furnace inside of the hearth electrode in front of same.

BRIEF DESCRIPTION OF THE DRAWINGS

The invention is described in greater detail by means of embodiments with reference to four Figures of drawings in which.

DETAILED DESCRIPTION OF THE INVENTION

Figure 1:
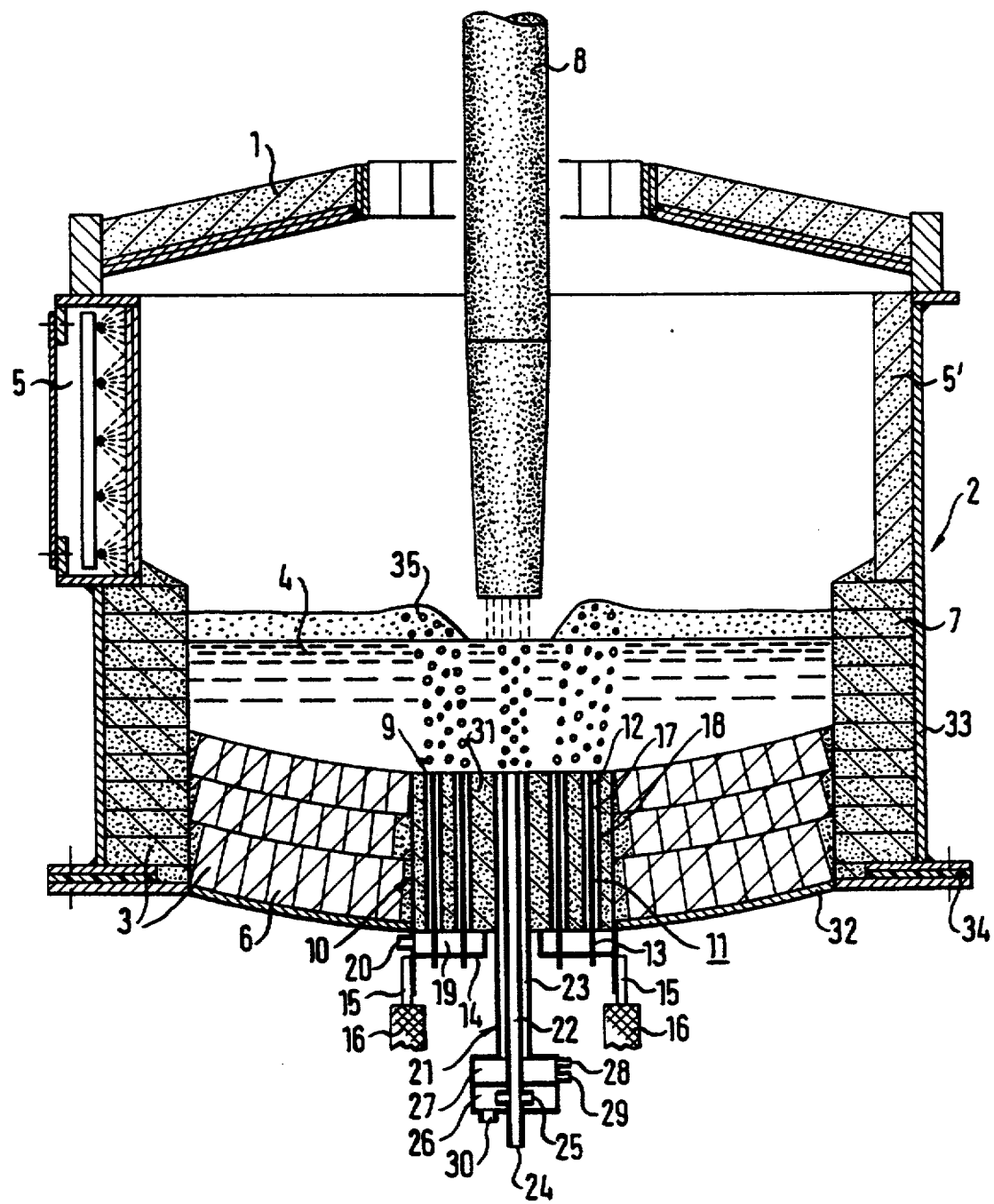
FIG. 1 is a view in longitudinal section through a direct current arc furnace with an electrode block fitted into the hearth bottom.

The direct current arc furnace shown in FIG. 1 includes a furnace vessel 2 which is closable by a water-cooled cover i and which is formed by a brick-lined furnace hearth 3 for accomodating a molten metal bath 4 and water-cooled or lined walls 5 and 5' respectively which are disposed above the maximum level of the molten bath. The bottom of the furnace hearth 3 is identified by 6 and the side wall thereof is identified by 7. An upper graphite electrode 8 which is connected as a cathode is introduced through an opening provided in the cover 1 for the electrode to pass therethrough. The hearth electrode 9 which is connected as the anode is provided in an electrode block 10 which is fitted into the hearth bottom 6. The electrode block 10 is arranged coaxially with respect to the upper electrode 8, that is to say symmetrically relative to the extended axis of that electrode, in the hearth bottom. The hearth electrode 9 is formed by a plurality of metal bars 11 with inner ends 12 facing towards the interior of the furnace, and outer ends 13 which are disposed in opposite relationship thereto. The outer ends are electrically conductively fixed in a metal plate 14 which affords good electrical conductivity and which has connections 15 for current conductors 16.

Each of the metal bars 11 of the hearth electrode 9 is disposed at a spacing, forming an annular duct 17, in a respective tube 18 which is fixed in the electrode block 10 and which passes through the hearth wall. Spacers are provided for fixing a metal bar 11 in place in a tube 18; the spacers afford no or only immaterial impediment to the flow of a cooling fluid through the annular duct 17 which serves as a cooling duct.

In the illustrated embodiment the metal plate 14 is of an annular configuration and defines a space 19 which communicates with the annular ducts 17. In the embodiment shown in FIG. 1, the space 19 is of an annular configuration, by virtue of further boundary walls. A cooling fluid can be supplied to the space 19 and therewith to the annular ducts 17 by way of an inlet 20.

Fitted in the middle of the electrode block 10 is a nozzle 21 which is formed by two concentric tubes which define a central duct 22 and an annular duct 23. The central duct 22 has a direct inlet 24 and an inlet 25 by way of an annular chamber 26. The annular duct 23 is connected to an annular chamber 27. The annular chamber 27 has inlets 28 and 29 for inert gas and water and is in the form of a mixing chamber so that a mist of inert gas and water can be fed to the annular duct 23.

The annular chamber 26 has an inlet 30 for the feed of oxygen so that oxygen can be fed to the central duct 22 through the inlet 25 by way of the annular chamber 26 and can be injected into the molten bath 4 through the central duct 22. Simultaneously or alternatively thereto, carbon can be injected by way of the direct inlet 24 of the central duct 22.

The electrode block 10 can be of different shapes. It may be for example of circular or square cross-section. Usual dimensions are a diameter of 200 mm, in the case of a circular cross-section, and an edge length of 200 mm, in the case of a square cross-section. The length of the electrode block 10 depends on the thickness of the hearth wall and is of the order of magnitude of 800 mm. The tubes 18 are for example cemented into the refractory body 31. They are arranged in the electrode block 10 in a distributed array over the cross-section, for example along concentric rings. A usual outside diameter for the tubes is a diameter of from 10 to 20 mm while a normal wall thickness is from 2 to 3 mm.

The metal bars 17 which are fitted into the tubes 18 and by way of which the electrode current is carried comprise a material which is a good electrical conductor such as copper or a copper alloy, for example a Cu-Ni-alloy, and they are usually from 3 to 12 mm in diameter. The metal bars are centered within the tubes 18 by means of spacers and are electrically conductingly anchored with their outer ends 13 in the metal plate 14. As, in the operating condition of the furnace, the metal bars are directly cooled over their entire length by the cooling fluid which flows through the annular ducts 17, the current density can be increased to more than 4 A/mm$^2$, when using copper.

In the furnace shown in FIG. 1, reference numeral 32 identifies a bottom plate and reference numeral 33 identifies a wall plate. The wall plate 33 is electrically insulated from the bottom plate 32 by an insulating disc 34. Reference numeral 35 identifies a layer of slag.

When the furnace is started up, after the furnace vessel has keen charged with solid charge material such as steel scrap, sponge iron etc, firstly carbon is injected, preferably by means of nitrogen as a carrier gas, through the central duct 22 of the nozzle, and a gas such as argon for promoting the formation and stabilisation of an arc plasma is injected through the annular duct 23 and also through the annular ducts 27. The injected carbon provides for an electrical connection to the electrically conducting charge material so that the arc firming conditions are improved for the upper graphite electrode 8 which is moved in through the cover 1. The formation and stabilisation of the arc plasma is also favoured by the injected cooling gas flow.

When the hearth electrode on the inside of the vessel 2 has reached a sufficiently high temperature to ensure that a water mist which is introduced through the cooling ducts 17 and 23 respectively immediately evaporates, being a condition which is achieved at the latest when the electrode block is covered with molten bath, a water mist is additionally supplied to the above-specified ducts, and that water mist, as already mentioned, produces a particularly high cooling action by virtue of the enthalpy of evaporation and the heat which is removed by dissociation, especially in the highly loaded region of the electrode block 10, which is towards the interior of the furnace. Usual amounts for an aerosol consisting of inert gas and water as a cooling agent are three to four cubic meters of inert gas and one to two liters of water, in each case per minute. If gaseous hydrocarbons are used as the cooling agent, about three to six cubic meters of natural gas or two to four cubic meters of propane, in each per minute, are required. It will be appreciated that the gas throughput rate depends on the number and size of the copper bars in the respective electrode block. The same cooling fluid can be used for the annular duct 23 of the nozzle 21, as for the cooling ducts 17 for cooling the metal bars 11. In the embodiment shown in FIG. 1 however, it is also possible to use different cooling agents, if required.

Figure 2:
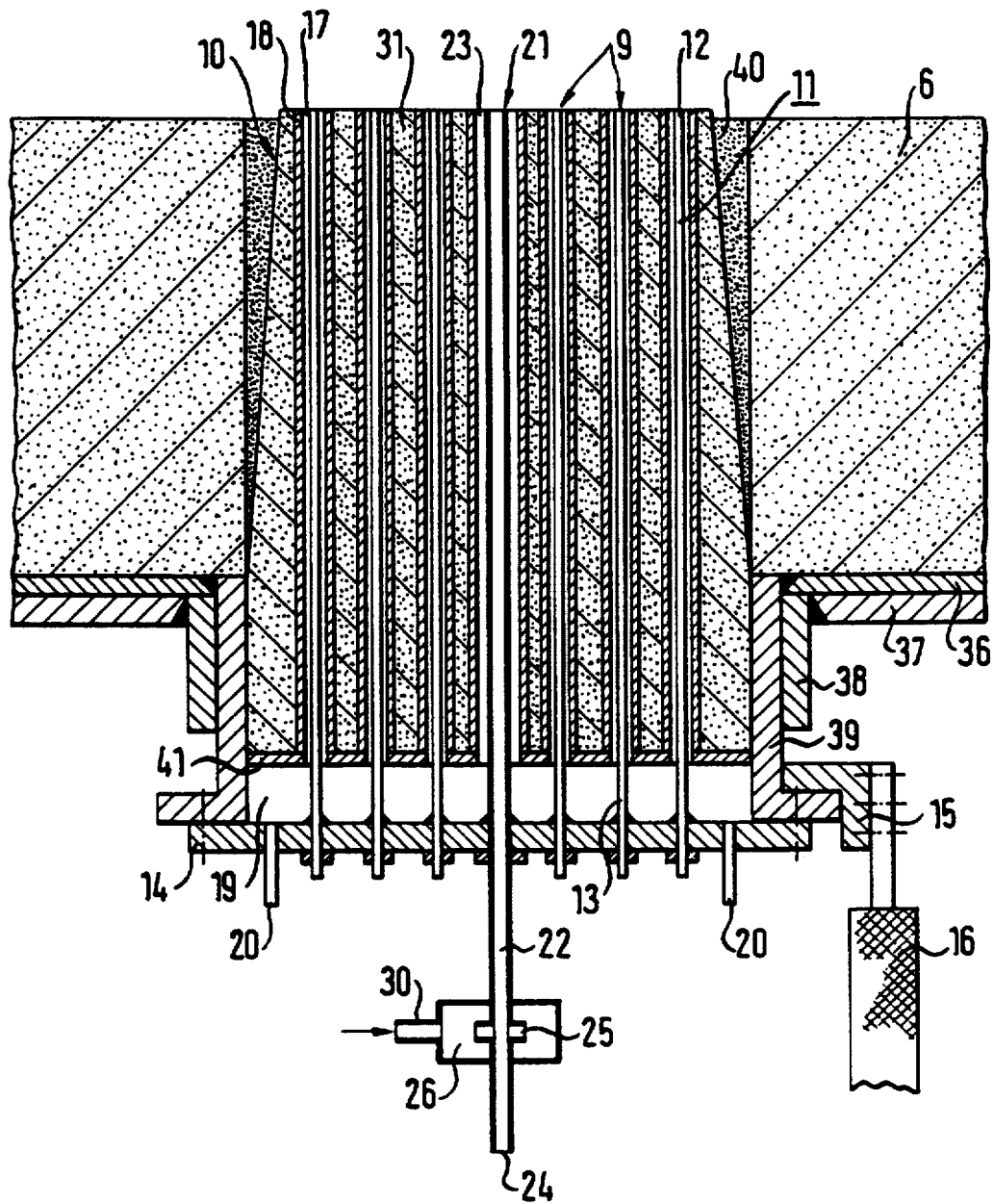
FIG. 2 is a view on an enlarged scale of the region containing a modified electrode block.

For the enlarged view of a bottom region of a furnace hearth, which includes an electrode block, as shown in FIG. 2, the same reference numerals are used to identify corresponding components, as in the view shown in FIG. 1. The electrode block 10 illustrated in FIG. 2 essentially differs from that shown in FIG. 1 in that the number of metal bars 11 is increased and the cooling duct 23 of the nozzle 21 is supplied with cooling agent from the same space 19 by way of which the cooling ducts 17 are also supplied.

The bottom plate is in the form of a steel plate 37 which is covered with a copper plate 36 and the refractory lining 6 is made from refractory material which is a good electrical conductor such as graphite-magnesite bricks, as will be described in greater detail with reference to FIG. 4, in order to provide an additional current discharge. The steel plate 37 has a flange 38 which receives a copper insert 39 which is electrically conductingly connected to the copper plate 36. The copper insert 39 also carries at least one connection 15 for a cable 16. The interchangeable electrode block 10 is centered by the copper insert 39 and the inside wall of the insertion opening in the hearth bottom 6. The gap between the electrode block and the refractory material of the hearth bottom 6 is plugged with refractory material 40.

The bottom of the refractory body of the electrode block 10 is closed off by a steel plate 41 in which are fixed the lower ends of the tubes 18 and the lower end of the jacket tube, which defines the annular duct 23, of the nozzle 21.

Figure 3:
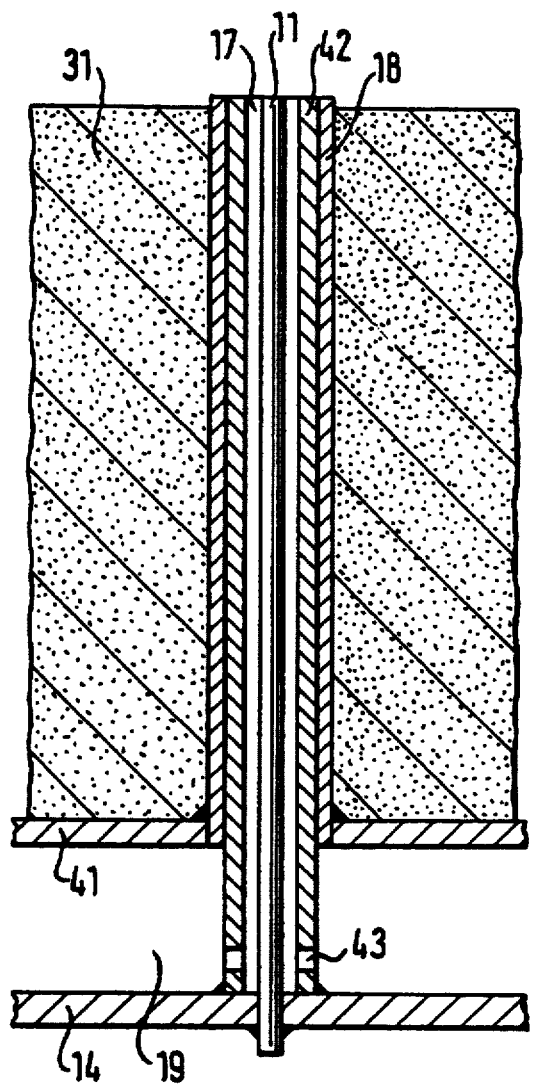
FIG. 3 shows a modification of a hearth electrode from FIG. 2.

FIG. 3 shows a cut-out portion illustrating a further modification of the hearth electrode. While, in the embodiment shown in FIGS. 1 and 2, the tubes 18 surrounding the metal bars 11 at a spacing therefrom are not used for carrying current and comprise steel, the embodiment of FIG. 3 shows how it is also possible to make use of those tubes for carrying current. For that purpose the tubes 18 are provided with a copper tube 42 which is pressed into position and which at the outer end is prolonged as far as the electrically conducting plate 14 and is electrically conductingly connected thereto. That arrangement permits current to be carried not only by way of the metal bar 11 but also by way of the copper tube 42, whereby the conduction cross-section is correspondingly increased. Inlets 43 are provided in the region of the chamber 19 for the supply of cooling agent into the annular duct 17. The cooling fluid is not only in direct contact with the metal bar but also with the copper tube 42 and provides for corresponding cooling thereof.

Figure 4:
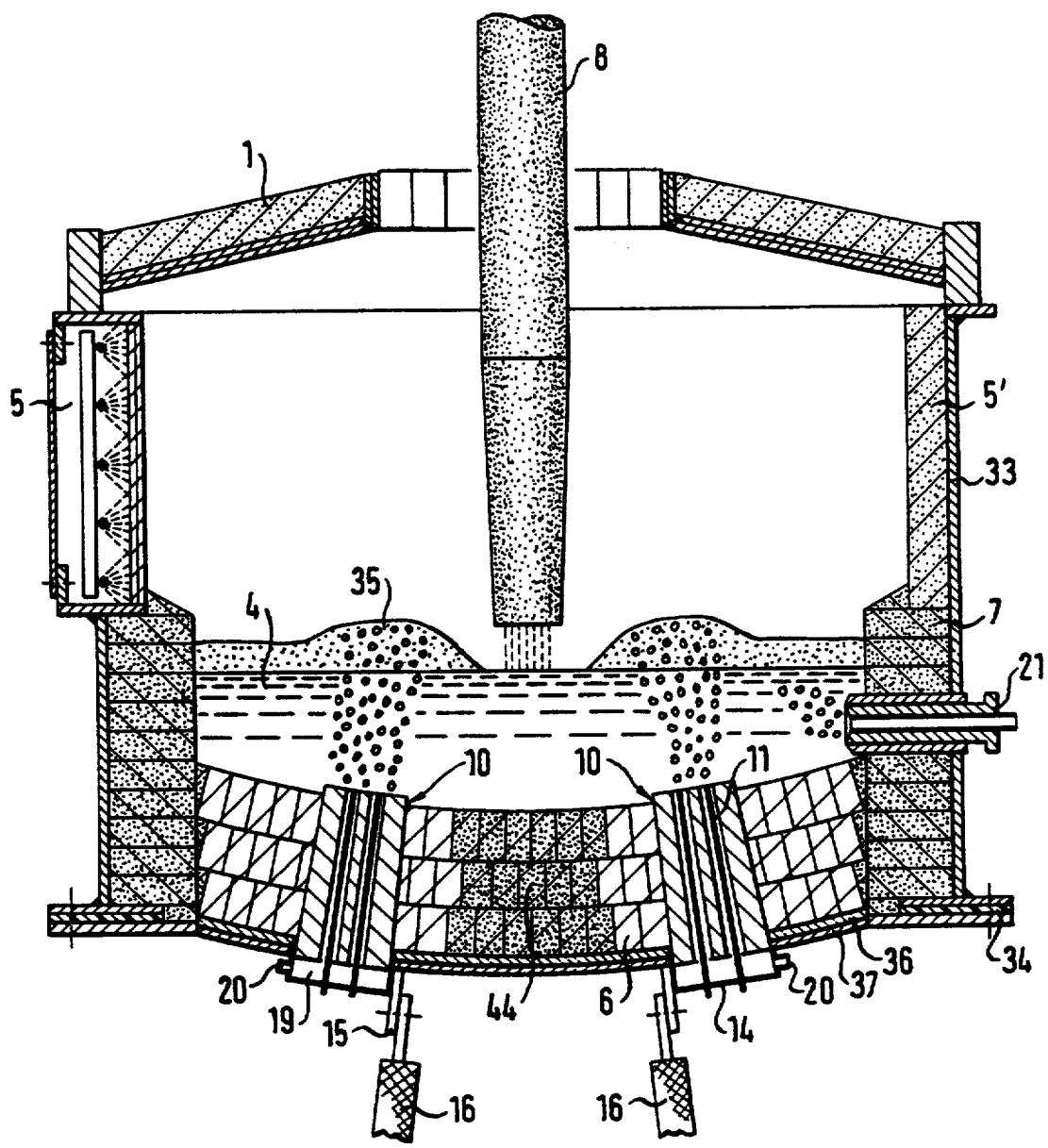
FIG. 4 is a view in longitudinal section of a further embodiment of a direct current arc furnace with four electrode blocks in the bottom and a nozzle in the side wall of the furnace hearth.

The arc furnace shown in FIG. 4 essentially differs from that shown in FIG. 1 in that, instead of a central electrode block, a plurality of electrode blocks 10, that is to say four electrode blocks, are disposed in the hearth bottom in a distributed array around the extended axis of the upper electrode 8, and that the current is carried not only by way of the hearth electrodes of the electrode blocks 10 but also by way of the brick lining of the hearth bottom. For that purpose, the bottom plate, as already described in FIG. 2, is in the form of a steel plate 37 which is covered with a copper plate 36. The copper plate is electrically conductingly connected to the connections 15 for the current cable 16 and also to the lining of the hearth bottom which, with the exception of the central region 44, comprises bricks which are good conductors of electricity, such as for example graphite-magnesite bricks. The central region 44 is only formed by magnesite bricks, like also the wall lining 7. The bottom plate 37 and the wall plate 33 of the vessel 2 are insulated from each other by the insulating discs 34. In the illustrated smelting furnace, the most substantial part of the entire current is carried by way of the four electrode blocks 10 which are arranged in a distributed array in the hearth bottom, and the remainder is carried by way of the current-carrying regions of the bottom lining 6 which is connected to the electrically conducting bottom plate.

The cooling agent which is injected through the electrode blocks causes good thorough mixing of the bath and causes the slag to foam up around the tip of the upper electrode 8 so that the walls are protected from the direct radiant heat from the arc. In the embodiment shown in FIG. 4, an under-bath nozzle 21 is provided in the side wall, for injecting carbon or oxygen.

We claim:

1. A metallurgical furnace comprising a hearth (3) for accommodating a molten bath (4) in the interior thereof, an upper electrode (8) and at least one hearth electrode (9) which is disposed in a hearth wall, the hearth electrode including at least one tube (18) which passes through the hearth wall and which is fixed therein, at least one metal bar (11) disposed at a spacing within the tube to form an annular cooling duct (17), which cooling duct extends along the length of the metal bar to an inner end thereof and said cooling duct opens into the interior of the furnace, the inner end (12) of the metal bar facing to the interior of the furnace and an outer end (13) of the metal bar which is in opposite relationship to the inner end being connected to an electrical connection (15) of a current conductor (16), the cooling duct being in fluid communication with a cooling agent inlet (20) for cooling the hearth electrode.

2. A furnace according to claim 1 characterised in that the hearth electrode includes at least two concentric tubes (18) of which the outermost one is fixed in the hearth wall and the metal bar (11) is fixed in the innermost one.

3. A furnace according to claim 1 characterised in that arranged in the hearth wall is at least one electrode block (10) which contains the hearth electrode, fixed in a body (31) of refractory material.

4. A furnace according to claim 1 characterised in that the hearth electrode (9) is arranged coaxially with respect to the upper electrode (8).

5. A furnace according to claim 1 characterised in that a plurality of hearth electrodes (9) are arranged in a distributed array around a longitudinal axis of the upper electrode (8).

6. A furnace according to claim 1 characterised in that a bottom wall (6) of the furnace hearth (3) is formed from electrically conducting refractory material and is electrically conductingly connected to a bottom plate (36) of the furnace hearth (3), which bottom plate has at least one electrical connection for a current conductor.

7. A hearth electrode for insertion into the hearth wall of a metallurgical furnace, the hearth electrode comprising at least one tube fixed therein and passing therethrough, at least one metal bar (11) disposed within the tube and spaced at a distance therefrom to form an annular cooling duct (17), the metal bar having an inner end (12) for facing towards the interior of the furnace when the hearth electrode is in place and an outer end which is in opposite relationship to the inner end for electrical connection (15) to a current conductor (16) and the cooling duct being located for fluid communication at an outer end thereof with a cooling agent inlet (20) for receiving cooling fluid, wherein the cooling duct (17) extends along the metal bar (11) to the inner end (12) thereof and terminates as an open duct.

8. A hearth electrode according to claim 7 characterised in that the tue (18) around the metal bar (11) is a steel tube provided on its inside with a copper layer (42).

9. An electrode block for insertion into a hearth wall of a metallurgical furnace, characterised in that said block includes a hearth electrode (9) for insertion into the hearth wall, the hearth electrode comprising at least one tube fixed therein and passing therethrough, at least one metal bar (11) disposed within the tube and spaced at a distance therefrom to form an annular cooling duct (17), the metal bar having an inner end (12) for facing towards the interior of the furnace when the hearth electrode is in place and an outer end which is in opposite relationship to the inner end for electrical connection (15) to a current conductor (16) and the cooling duct being located for fluid communication at an outer end thereof with a cooling agent inlet (20) for receiving cooling fluid, wherein the cooling duct (17) extends along the metal bar (11) to the inner end (12) thereof and terminates as an open duct, which hearth electrode is fixed in a body (31) of refractory material.

10. An electrode block according to claim 9 characterised in that the refractory material substantially comprises a material chosen from magnesite and magnesite-graphite.

11. An electrode block according to claim 9 characterised in that at least two tubes (18) are fixed in the body (31) of refractory material, and the outer ends of the metal bars (11) project from the hearth wall and are fixed in a metal plate (14), which metal plate has the connection (15) for the current conductor (16).

12. An electrode block according to claim 9 characterised in that it has a nozzle (21) comprising at least one tube.

13. An electrode block according to claim 12 characterised in that the nozzle (21) includes at least two tubes which are arranged concentrically and at a spacing from each other, the tubes being a central duct (22) and at least one annular duct (23) arranged therearound, the central and annular ducts being communicated with separate respective chambers which have inlets for feeding agents into the ducts.

14. A method of operating a metallurgical furnace, comprising the steps of:

providing a hearth (3) for accommodating a molten bath (4) in the interior thereof, an upper electrode (8) and at least one hearth electrode (9) which is disposed in a hearth wall, the hearth electrode including at least one tube (18) which passes through the hearth wall and which is fixed therein, at least one metal bar (11) disposed at a spacing within the tube to form an annular cooling duct (17), which cooling duct extends along the length of the metal bar to an inner end thereof and said cooling duct opens into the interior of the furnace, the inner end (12) of the metal bar facing to the interior of the furnace and an outer end (13) of the metal bar which is in opposite relationship to the inner end being connected to an electrical connection (15) of a current conductor (16), the cooling duct being in fluid communication with a cooling agent inlet (20) for cooling the hearth electrode, at the beginning of a smelting phase for solid batch material, injecting a has for promoting the formation and stabilization of an arc plasma through the cooling duct of the hearth electrode and after the hearth electrode is covered with molten bath, injecting an aerosol of water and gas through the cooling duct.

15. A method according to claim 14 characterised in the coal dust is injected at the beginning of the smelting phase through one of the cooling duct of the hearth electrode and a duct adjacent thereto.

* * * * *

UNITED STATES PATENT AND TRADEMARK OFFICE
CERTIFICATE OF CORRECTION

PATENT NO. : 5,371,759
DATED : December 6, 1994
INVENTOR(S) : William Wells; and Emil Elsner It is certified that an error appears in the above-identified patent and that said Letters Patent is hereby corrected as shown below:

On the title page, item [22] should read as follows:

[22] PCT Filed: Sept. 10, 1992

Signed and Sealed this

Fourteenth Day of March, 1995

Attest:

BRUCE LEHMAN

Attesting Officer     Commissioner of Patents and Trademarks